Patented Feb. 20, 1923.

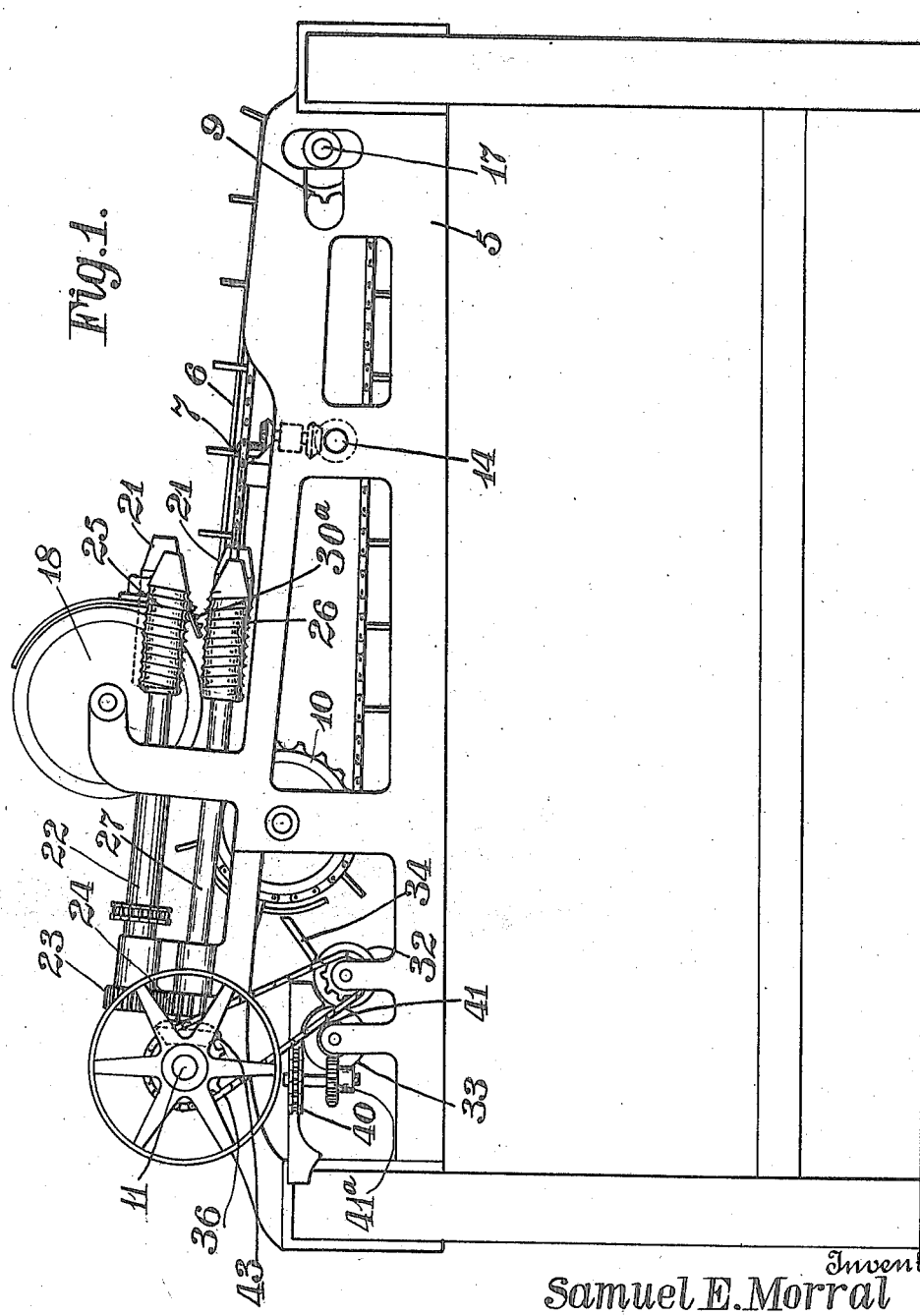

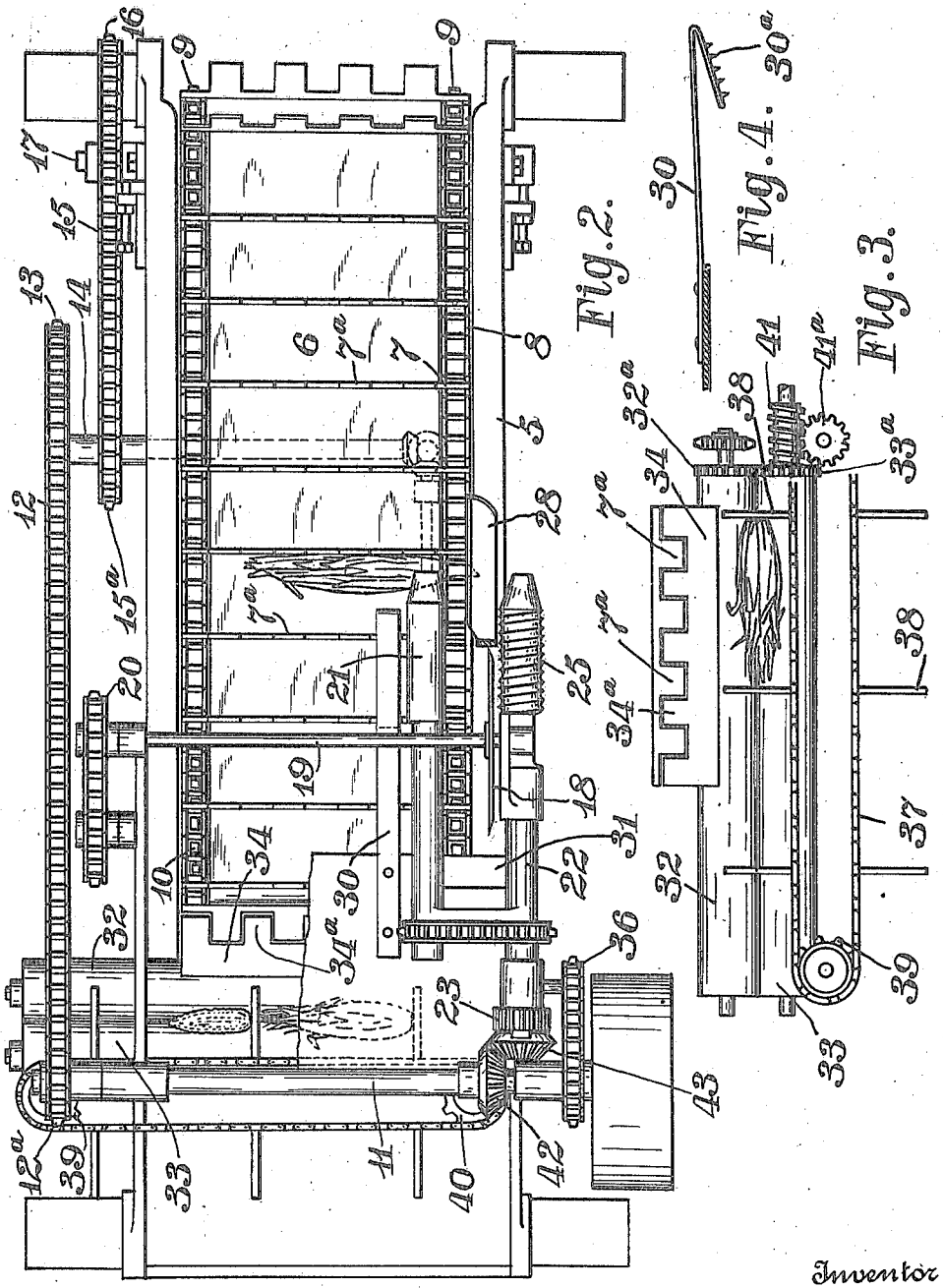

1,445,843

UNITED STATES PATENT OFFICE.

SAMUEL E. MORRAL AND WILLIAM W. MORRAL, OF MORRAL, OHIO.

GREEN-CORN-HUSKING MACHINE.

Application filed July 22, 1921. Serial No. 486,948.

*To all whom it may concern:*

Be it known that we, SAMUEL E. MORRAL and WILLIAM W. MORRAL, citizens of the United States, residing at Morral, in the county of Marion and State of Ohio, have invented a certain new and useful Improvement in Green-Corn-Husking Machines, of which the following is a specification.

This invention relates to the type of machine shown for example in our patent of the United States No. 1,121,936, dated December 22, 1914, and has for its object generally to simplify the construction and particularly to provide an improved arrangement of the husking rolls and means for delivering the butted ears to such rolls. Other features of the invention will be gathered from the disclosure herein.

The invention is embodied in the example herein shown and described, the features of novelty being finally claimed.

In the accompanying drawing—

Figure 1 is a view in side elevation of the left hand side of the machine.

Fig. 2 is a top plan view.

Fig. 3 is a top plan view of the husking rolls and

Fig. 4 is a detail of a spurred finger for loosening the husks after the ears are butted.

In the views 5 designates a suitable frame upon which is supported a suitable table 6. Traveling over this table 6 is an ear feeding belt composed of regularly spaced blades 7 connected at their opposite ends to sprocket chains 8 that are carried on suitable sprocket wheels at 9 and 10. The belt is driven by means of a main power shaft 11 operating a sprocket chain 12 running from a sprocket wheel 12$^a$ to a sprocket wheel 13 on an intermediate shaft 14 and by a similar chain 15 extending from a sprocket 15$^a$ on the intermediate shaft to a sprocket 16 on a shaft 17 having the sprockets 9 for driving the chains 8. The blades or flights 7 are formed with a series of large square teeth as shown at 7$^a$ alined with each other on the belt.

The butt cutter or remover is in the form of a rotary knife 18 mounted on a shaft 19 driven by a sprocket chain 20 from the shaft containing the sprockets 10. To position the ear for removing the butt we employ a pair of rolls 21—21, the upper one of which is driven by a sprocket chain from a shaft 22 geared to the main power shaft by spur gears 23 and 24 and the lower one of which is driven by suitable gearing operated by the aforesaid intermediate shaft 14. Beyond the butt remover are gaging screws 25 and 26 carried one by the shaft 22 and the other by a shaft 27 operated by the spur gears 23 and 24, the shaft 27 being driven by a bevel gear 42 on the main power shaft 11 meshing with a similar gear 43 on said shaft 27. The gaging screws 25 and 26 gage the amount of butt to be removed by the knife 18. The character 28 designates a spring to hold the butt of the ear down so that it will be properly fed to the gaging screws. 30 designates a spring tongue secured to a frame plate 31 to lie in the path of the ears and in line with the slot or spaces between corresponding pairs of the teeth 7$^a$ of the flights 7, said tongue having a bent end, the lower side of which is provided with spurs 30$^a$ (see Fig. 4) to engage the husks and loosen them while the butt is being removed.

The husking rolls designated 32 and 33 are, according to our present invention, arranged transversely of the direction of movement of the feed belt at the rear end of the machine. In order to insure the delivery of the ears to such rolls we provide a stationary transfer plate 34 inclined toward the space between the rolls, said plate provided with square teeth 34$^a$ like those on the flights of the feed belt but located so that the teeth of the flights shall pass between the teeth of the plate.

In operation the ear falls from a flight of the feed belt onto the plate 34 while the flight and plate are in substantial alinement. This construction insures the delivery of the ear by gravity alone to the husking rolls in proper position for the removal of the husks. The husking rolls are geared together to rotate toward each other at the top through gears 32$^a$ and 33$^a$, the power for driving them being derived through a belt 36 from the main power shaft 11.

To feed the ears along the space between the husking rolls we provide a sprocket chain 37 having vertical flights 38, said chain being carried by sprockets 39 and 40 driven by a gear 41$^a$ engaged by worm 41 on the husking roll 33. The mechanism for moving the flights 38 is timed to bring the spaces between pairs of them successively into position to receive an ear from each flight of the main feed belt.

The forward, front and feeding end of the machine is that end shown at the right in Figs. 1 and 2. The ears of corn are fed one at a time between the flights at the top of the table and are carried to the guiding, gaging and butting devices substantially as set forth in our former patents. From the butting and husk loosening devices the ear is delivered to husking rolls as before described and finally discharged from said rolls at the right hand side of the machine.

The forms of the parts can be changed without departing from the gist of the invention as claimed.

What we claim is:

1. In a corn husking machine, the combination with an ear feeding belt including toothed ear engaging flights thereon, and butting means, of a pair of husking rolls arranged transversely of the direction of motion of the feeding belt and in position to receive the ears discharged from said belt and a toothed plate between the teeth of which the teeth of the toothed flights of the feed belt pass for guiding the ears to said husking rolls.

2. In a corn husking machine, the combination with an ear feeding belt including toothed ear engaging flights thereon, and butting means, of a pair of husking rolls arranged transversely of the direction of motion of the feeding belt and in position to receive the ears discharged from said belt and a downwardly inclined toothed plate between the teeth of which the teeth of the toothed flights of the feed belt pass for guiding the ears to said husking rolls.

3. In a corn husking machine, the combination with an ear feeding belt including toothed ear engaging flights thereon and butting means, of a pair of husking rolls arranged transversely of the direction of motion of the feeding belt and in position to receive the ears discharged from said belt and a toothed plate between the teeth of which the teeth of the toothed flights of the belt pass for guiding the ears to said husking rolls and means for moving the ears along said husking rolls.

4. In a corn husking machine, the combination of a butt remover, husking rolls, means including two belts with flights connecting them for feeding the ear crosswise of its length to the butt remover, means for feeding the ear in the direction of its length toward the butt remover, gaging screws located beyond the cutter for controlling the amount of butt removed, said first named feeding means adapted to convey the ear from the butt remover to the husking rolls and means for moving the ears along the husking rolls.

5. In a corn husking machine, the combination of a butt remover, husking rolls, means for feeding the ear crosswise of its length to the butt remover, rolls for feeding the ear in the direction of its length toward the butt remover and gaging screws beyond the cutter for controlling the amount of butt removed, said first named feeding means adapted to convey the ear from the butt remover to the husking rolls and a transfer device coacting with said ear feeding means to direct the ear to said husking rolls.

SAMUEL E. MORRAL.
WILLIAM W. MORRAL.